United States Patent
Minot et al.

(10) Patent No.: US 10,231,160 B2
(45) Date of Patent: *Mar. 12, 2019

(54) METHOD FOR THE INTEGRATION OF A FIXED STATION OR OF A FIXED RADIO SUB-SYSTEM, AND DEVICES IMPLEMENTING SUCH A METHOD

(71) Applicant: Pierre Minot, Les Molieres (FR)

(72) Inventors: Pierre Minot, Les Molieres (FR); Pierre Ngouat, Juilly (FR)

(73) Assignee: Pierre Minot, Les Molieres (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/378,243

(22) Filed: Dec. 14, 2016

(65) Prior Publication Data
US 2017/0094573 A1    Mar. 30, 2017

Related U.S. Application Data

(63) Continuation of application No. 13/866,666, filed on Apr. 19, 2013, now Pat. No. 9,615,403.

(30) Foreign Application Priority Data

Dec. 5, 2012    (FR) .................................... 12 61697

(51) Int. Cl.
*H04W 36/14* (2009.01)
*H04W 92/02* (2009.01)
*H04W 16/14* (2009.01)
*H04W 92/04* (2009.01)
*H04W 92/20* (2009.01)
*H04W 84/04* (2009.01)

(52) U.S. Cl.
CPC ........... *H04W 36/14* (2013.01); *H04W 16/14* (2013.01); *H04W 92/02* (2013.01); *H04W 84/042* (2013.01); *H04W 92/045* (2013.01); *H04W 92/20* (2013.01)

(58) Field of Classification Search
CPC .............................. H04W 84/18; H04W 84/12
See application file for complete search history.

(56) References Cited

U.S. PATENT DOCUMENTS

| | | | |
|---|---|---|---|
| 6,711,417 B1 | 3/2004 | Gorman et al. | |
| 7,756,468 B2 * | 7/2010 | Kojima | H04B 7/155 455/7 |
| 2004/0264403 A1 * | 12/2004 | Fette | H04B 1/0064 370/328 |

(Continued)

FOREIGN PATENT DOCUMENTS

EP    2387186 A1    11/2011

*Primary Examiner* — Zhiren Qin
(74) *Attorney, Agent, or Firm* — Greer, Burns & Crain, Ltd.

(57) ABSTRACT

A method for connecting a first device belonging to a first mobile communications network of the narrow band type to a second mobile communications network of the wide band type, the device implementing a protocol layer for communicating with a first plurality of mobile terminals according to a first mobile communications standard, including a modification of the first device by integration of a transposition layer in the protocol layer and being linked to the second communications network of the wide band type via a link of the Internet Protocol (IP) type.

16 Claims, 2 Drawing Sheets

(56) References Cited

U.S. PATENT DOCUMENTS

| | | |
|---|---|---|
| 2007/0041360 A1 | 2/2007 | Gallagher et al. |
| 2011/0150219 A1* | 6/2011 | Newberg .................. H04L 9/12 380/255 |
| 2012/0155282 A1* | 6/2012 | Dorenbosch ........ H04W 72/005 370/241.1 |
| 2014/0233408 A1* | 8/2014 | Bontu ............... H04W 36/0094 370/252 |

* cited by examiner

METHOD FOR THE INTEGRATION OF A FIXED STATION OR OF A FIXED RADIO SUB-SYSTEM, AND DEVICES IMPLEMENTING SUCH A METHOD

CROSS-REFERENCE TO RELATED APPLICATIONS

This application is a continuation of and claims priority to U.S. patent application Ser. No. 13/866,666 filed on Apr. 19, 2013, now U.S. Pat. No. 9,615,403, which claims priority to French Patent Application No. 12 61697 filed on Dec. 5, 2012, the entire contents of which are incorporated herein by reference.

TECHNICAL FIELD

The present invention relates to a method for the integration of radio networks according to the APCO International Project 25 (or P25) family of American technological standards in a radio network of the EPS and LTE (Long Term Evolution) type.

This invention allows the use of P25 radio terminals in such a network of the $3^{rd}$ or $4^{th}$ generation or later, whilst providing services characteristic of the P25 networks and direct interlinks with non-P25 radio terminals of the 3GPP LTE family.

BACKGROUND

Radio networks according to the P25 technological standards are widespread throughout the world, with a high concentration in the American continent; they are used in a professional context, in particular for the needs of public security forces. These networks use reserved narrow frequency bands, with channels of width 12.5 kHz (P25 Phase 1—FDMA) or 6.25 Khz (P25 Phase 2—TDMA or FDMA), spaced apart by 6.25 kHz. These networks offer a very complete set of functions not necessitating a high data rate. The networks are constituted by radio sites the range of which is relatively long.

Conversely, radio networks of the fourth generation or later, principally based on the Advanced 3GPP LTE technology, use radio sites of often shorter range on different frequency bands, used with very wide channels offering services necessitating high data rates.

Linking these two types of networks is of great interest.

It has in particular been envisaged to develop radio terminals capable of transmitting and receiving in both modes (P25 and LTE) configured for using the LTE networks where they are covered by the latter and the P32 networks in the opposite case. This method of linking the two types of networks does however have numerous drawbacks. In particular, this solution necessitates the complete changing of all the terminals in service as well as the installation of high level service gateways.

It has moreover been envisaged to use 3GPP LTE networks as a transport layer for the 25 networks: this method also has many drawbacks. In particular, it does not allow direct linking between LTE radio terminals and P25 radio terminals.

Finally, gateways between a P25 network and an EPS network with LTE radio access are known. These gateways provide simple network interlink functions, without being able to provide real integration. For example, mobility is not managed and a calling terminal must dial the number of a correspondent according to the place where the latter is assumed to be.

SUMMARY

The method described here allows complete interlink of P25 networks and wide band radio networks of the $3^{rd}$ or $4^{th}$ or later generation, such as networks according to the 3GPP EPS standard implementing the radio access of the LTE family without having the drawbacks mentioned above whilst offering direct communication facilities between terminals of different technologies and offering the possibility of optimizing the use of the radio spectrum.

A purpose of the present invention is to propose a method and a device for the link of P25 networks and radio networks of the $3^{rd}$ or $4^{th}$ or later generation, typically based on the EPS and 3GPP LTE family of standards, allowing all of the existing radio terminals to be used again.

Another purpose of the present invention is to propose a method and a device for the link of P25 networks and radio terminals of the $3^{rd}$ or $4^{th}$ or later generation, based on the 3GPP EPS and 3GPP LTE family of technologies allowing the provision of existing P25 services.

Another purpose of the present invention is to propose a method and a device for the link of P25 networks and radio networks of the $3^{rd}$ or $4^{th}$ or later generation, based on the 3GPP EPS and LTE family of technologies, allowing easy migration during the evolution from a P25 network to a network of the 3GPP EPS and 3GPP LTE family of technologies.

Another purpose of the present invention is to propose a method and a device for the link of P25 networks and the networks of the 3GPP EPS and 3GPP LTE family of technologies allowing an economic optimizing between networks of the 3GPP EPS and 3GPP LTE technology family in an urban environment and P25 networks in isolated environments, directly connected with each other.

Another purpose of the present invention is to propose a method and a device for the link of P25 networks and radio networks of the $3^{rd}$ or $4^{th}$ or later generation, 3GPP LTE allowing a re-use of the radio channels allocated to P25 networks (narrow band channels) in places where radio channels of the $3^{rd}$ or $4^{th}$ or later generation (wide band channels), the subject of the interlink, with LTE frequencies, are not available (or in places where it is not cost effective to set up 3GPP LTE radio networks of the $3^{rd}$ or $4^{th}$ or later generation).

At least one of the abovementioned objectives is achieved with a method for connecting a first device belonging to a first mobile communications network of the narrow band type to a second mobile communications network of the wide band type, said device implementing a protocol layer for communicating with a first plurality of mobile terminals according to a first mobile communications standard, characterized in that it comprises a modification of the first device by integration of a transposition layer in said protocol layer and is linked to the second communications network of the wide band type via a link of the Internet Protocol (IP) type. The modified protocol stack comprises the standardized transport layers and a functional transposition module, typically embedded in the NAS (Non Access Stratum) layer.

Moreover, the method according to the invention can be implemented for establishing exchanges between mobile terminals according to the first mobile communications standard placed under the management of the first modified device and other mobile terminals according to said first mobile communications standard placed under the management of a second modified device, via the second mobile communications network of the wide band type.

Moreover, the method according to the invention can be implemented for establishing exchanges between mobile terminals according to the first mobile communications standard placed under the management of the first modified device and mobile terminals according to the second mobile communications standard placed under the cover of base stations belonging to the second communications network of the wide band type.

In a particular version, the first communications network of the narrow band type can comply with the P25 APCO International Project 25 family of technological standards.

Moreover, the second communications network of the wide band type can comply with the 3GPP EPS and LTE (Long Term Evolution) family of technologies.

Advantageously, the transposition layer can implement a standardized S1 interface for the Control Plane of the 3GPP EPS and LTE standard.

Moreover, the standardized S1 interface can be completed by a standardized X2 interface of the 3GPP EPS family of technologies for a link between close base stations.

Moreover, the S1 standardized interface can be completed by a standardized M1 interface of the 3GPP EPS and LTE family of technologies.

According to another aspect of the invention, there is also proposed a base station belonging to a first mobile communications network of the narrow band type, adapted for being connected to a second mobile communications network of the wide band type according to a second mobile communications standard, said base station implementing a protocol layer for communicating with a first plurality of mobile terminals according to a first mobile communications standard, characterized in that said base station is modified by integration of a transposition layer in said protocol layer and is linked to said second communications network of the wide band type via a link of the Internet Protocol (IP) type.

Moreover, the base station according to the invention can be configured for establishing exchanges between mobile terminals according to the first mobile communications standard placed under the management of said base station and other mobile terminals placed under the management of another base station according to the invention, via the second mobile communications network of the wide band type.

Moreover, the base station according to the invention can be configured for establishing exchanges between mobile terminals according to the first mobile communications standard placed under the cover of said base station and mobile terminals according to the second mobile communications standard placed under the cover of base stations belonging to the second communications network of the wide band type.

Moreover, the second communications network of the wide band type can comply with the 3GPP EPS and LTE (Long Term Evolution) family of technologies (standards).

Moreover, the base station according to the invention can be configured for establishing exchanges between mobile terminals according to the first mobile communications standard placed under the cover of said base station, and any other base equipment complying with the first communications standard according to the invention, via the second mobile communications network of the wide band type.

Moreover, the transposition layer can implement a standardized S1 interface of the 3GPP EPS and LTE family of technologies.

Moreover, the standardized S1 interface can be completed by a standardized X2 interface of the 3GPP EPS and LTE family of technologies.

Moreover, the standardized S1 interface can be completed by a standardized M1 interface of the 3GPP EPS and LTE family of technologies.

According to another aspect of the invention, there is also proposed a fixed radio sub-system belonging to a first mobile communications network of the narrow band type, adapted for being connected to a second mobile communications network of the wide band type according to a second mobile communications standard, said fixed radio sub-system implementing a protocol layer for communicating with a first plurality of base stations according to a first mobile communications standard, characterized in that said fixed radio sub-system is modified by integration of a transposition layer in said protocol layer and is linked to said second communications network of the wide band type via a link of the Internet Protocol (IP) type.

The fixed radio sub-system according to the invention can be configured for establishing exchanges between mobile terminals according to the first mobile communications standard placed under its management or under that of a base station with which it communicates, and mobile terminals according to the second mobile communications standard placed under the cover of base stations belonging to the second communications network of the wide band type.

The fixed radio sub-system can be configured for establishing exchanges between mobile terminals according to the first mobile communications standard placed under its management or under that of a base station with which it communicates and other mobile terminals placed under the management of another base station according to the invention, via the second mobile communications network of the wide band type.

The fixed radio sub-system can be configured for establishing exchanges between mobile terminals according to the first mobile communications standard placed under its management or under that of a base station with which it communicates, and other mobile terminals places under the management of another fixed radio sub-system according to the invention, via the second mobile communications network of the wide band type.

The fixed radio sub-system can be configured for establishing exchanges between mobile terminals according to the first mobile communications standard placed under its management or under that of a base station with which it communicates, and any other base equipment complying with the first communications standard according to the invention, via the second mobile communications network of the wide band type.

The second communications network of the wide band type can comply with the 3GPP EPS and LTE (Long Term Evolution) standard.

The transposition layer can implement a standardized S1 interface of the 3GPP EPS and LTE family of technologies.

The standardized S1 interface can be completed by a standardized X2 interface of the 3GPP EPS and LTE family of technologies.

The standardized S1 interface can be completed by a standardized M1 interface of the 3GPP EPS and LTE family of technologies.

BRIEF DESCRIPTION OF THE DRAWINGS

Other advantages and features of the invention will become apparent on reading the detailed description of implementations and of an embodiment, that is in no way limitative, and the following attached drawings.

DETAILED DESCRIPTION

Figure 1:
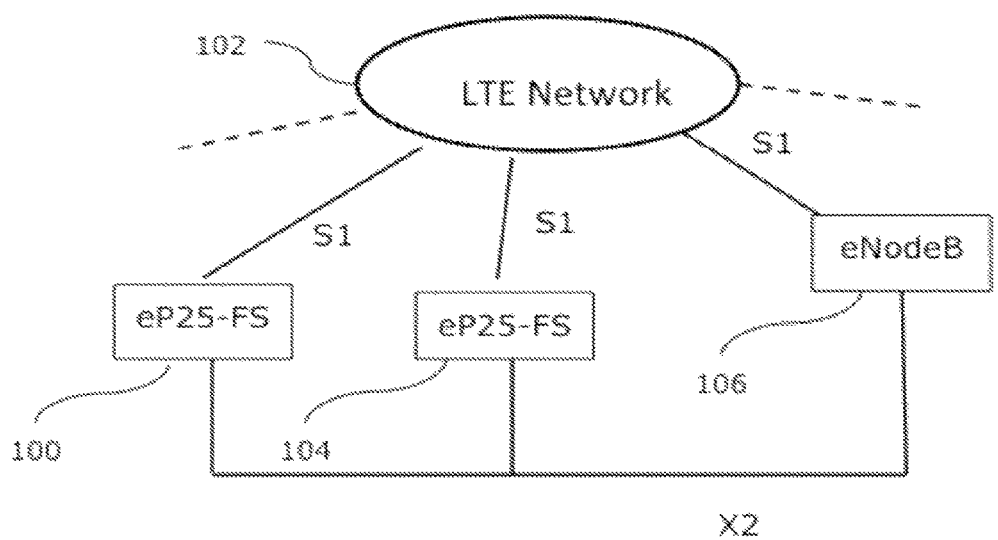
FIG. 1 is a diagrammatic representation of a first embodiment of a method according to the invention in which a base station according to the invention is shown.

FIG. 1 is a diagrammatic representation in which is shown a direct interconnection of a base station 100 according to the invention with a second network 102.

The base station 100 belongs to a first mobile communications network of the narrow band type. It is adapted for being connected with the second mobile communications network 102 of the wide band type according to a second mobile communications standard. The second communications network 102 of the wide band type complies with the 3rd or 4th or later generation standard of the 3GPP EPS and LTE (Long Term Evolution) family of technologies.

The base station 100 implements a protocol layer for communicating with a first plurality of mobile terminals (not shown) according to the first mobile communications standard. The base station is modified by integration of a transposition layer in the protocol layer and is linked to said second communications network of the wide band type via a link of the Internet Protocol (IP) type. The transposition layer implements a standardized S1 interface of the 3GPP EPS and LTE standard.

It is configured for establishing exchanges between mobile terminals according to the first mobile communications standard placed under the management of the latter and other mobile terminals placed under the management of another base station according to the invention, 104, via the second mobile communications network of the wide band type.

The base station 100 is configured for establishing exchanges between mobile terminals according to the first mobile communications standard placed under the cover of the base station and mobile terminals according to the second mobile communications standard placed under the cover of base stations 106 belonging to the second communications network 102 of the wide band type.

FIG. 1 shows that the standardized S1 interface is completed by a standardized X2 interface of the 3GPP EPS and LTE 3GPP X2 family of technologies interconnecting the base stations 100, 104 and 106.

Figure 2A:
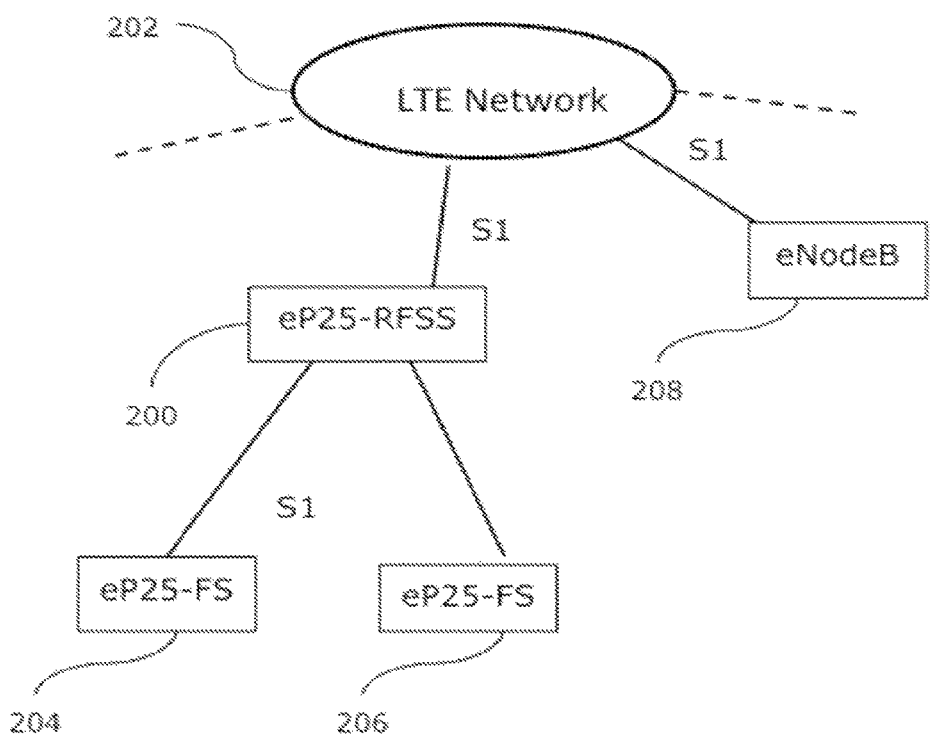
FIGS. 2A and 2B are diagrammatic representations of a second and third embodiments of a method according to the invention in which a fixed radio sub-system according to the invention is shown.

FIG. 2A is a diagrammatic representation in which is shown a direct interlink of a fixed radio sub-system 200 according to the invention with a second network 202.

The fixed radio sub-system (eP25-RFSS) 200 belongs to a first mobile communications network of the narrow band type. It is adapted for being connected with the second mobile communications network 202 of the wide band type according to a second mobile communications standard. The second communications network 202 of the wide band type complies with a 3rd or 4th or later generation standard of the 3GPP EPS and the 3GPP LTE (Long Term Evolution) standard family of technologies.

The fixed radio sub-system 200 implements a protocol layer for communicating with two base stations 204, 206, according to a first mobile communications standard.

The fixed radio sub-system 200 is modified by integration of a transposition layer in said protocol layer and is linked to the second communications network 202 of the wide band type via a link of the Internet Protocol (IP) type. The transposition layer implements a standardized S1 interface of the standard specified for the 3GPP EPS and LTE family of technologies. The standardized S1 interface is completed by a standardized X2 interface of the 3GPP EPS and LTE 3GPP X2 (not shown) family of technologies. The standardized S1 interface can be completed by a standardized M1 interface of the 3GPP EPS and LTE 3GPP M1 (not shown) family of technologies.

The fixed radio sub-system 200 is configured for establishing exchanges between mobile terminals according to the first mobile communications standard (not shown) placed under the management of the base stations 204, 206 and other mobile terminals placed under the management of another fixed radio sub-system according to the invention (not shown), via the second mobile communications network of the wide band type.

The fixed radio sub-system according to the invention is also configured for establishing exchanges between mobile terminals (not shown) according to the first mobile communications standard placed under the cover of said fixed radio sub-system and mobile terminals (not shown) according to the second mobile communications standard placed under the cover of a base station 208 belonging to the second communications network of the wide band type.

Figure 2B:
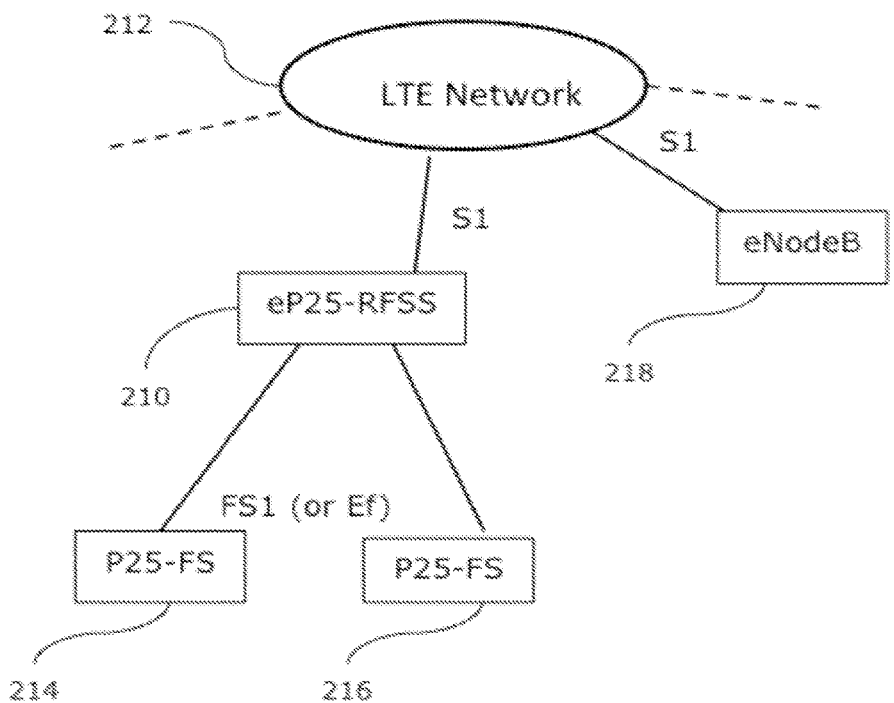

FIG. 2B is a diagrammatic representation in which is shown a direct interlink of a fixed radio sub-system 210 according to the invention with a third network 212.

The fixed radio sub-system (eP25-RFSS) 210 belongs to a first mobile communications network of the narrow band type. It is adapted for being connected with the second mobile communications network 212 of the wide band type according to a second mobile communications standard. The second communications network 212 of the wide band type complies with a 3rd or 4th or later generation standard of the 3GPP EPS and the 3GPP LTE (Long Term Evolution) standard family of technologies.

The fixed radio sub-system 210 implements a protocol layer for communicating with two base stations 214, 216, according to a first mobile communications standard.

The fixed radio sub-system 210 is modified by integration of a transposition layer in said protocol layer and is linked to the second communications network 212 of the wide band type via a link of the Internet Protocol (IP) type. The transposition layer implements a standardized S1 interface of the standard specified for the 3GPP EPS and LTE family of technologies. The standardized S1 interface is completed by a standardized X2 interface of the 3GPP EPS and LTE 3GPP X2 (not shown) family of technologies. The standardized S1 interface can be completed by a standardized M1 interface of the 3GPP EPS and LTE 3GPP M1 (not shown) family of technologies.

The fixed radio sub-system 210 is configured for establishing exchanges between mobile terminals according to the first mobile communications standard (not shown) placed under the management of the base stations 214, 216 and other mobile terminals placed under the management of another base radio sub-system according to the invention (not shown), via the second mobile communications network of the wide band type.

The fixed radio sub-system according to the invention is also configured for establishing exchanges between mobile terminals (not shown) according to the first mobile communications standard placed under the cover of said fixed radio sub-system and mobile terminals (not shown) according to the second mobile communications standard placed under the cover of a base station 218 belonging to the second communications network of the wide band type.

Figure 3:
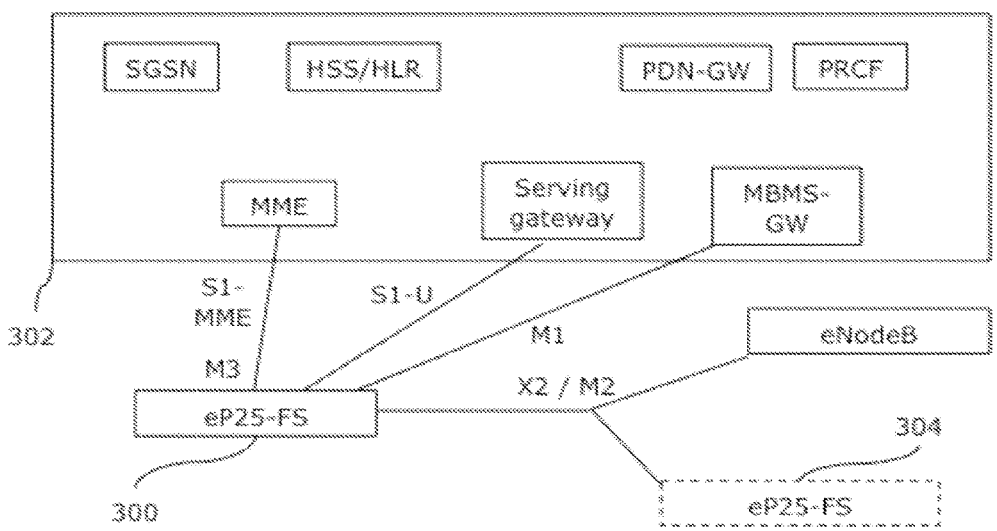
FIG. 3 is a diagrammatic representation of an embodiment of a base station according to the invention.

FIG. 3 is a diagrammatic representation in which is shown a direct interconnection of a base station 300, called eP25-FS, according to the invention with the items of equipment of a $3^{rd}$ or 4th or later generation radio network 302, of the 3GPP EPS and 3GPP LTE family of technologies.

The base station eP25-FS 300 belongs to a first mobile communications network of the narrow band type.

It is adapted for being connected to a second communications network 302 of the wide band type according to a second mobile communications standard. The second communications network of the wide band type complies with a 3rd or 4th or later generation standard of the 3GPP EPS family of technologies and the 3GPP LTE (Long Term Evolution) standard.

The 3rd or 4th or later generation network of the 3GPP EPS and LTE 302 family of technologies comprises usual modules presents in a network of the 3GPP EPS and LTE family of technologies such as:
- an SGSN (Serving GPRS Support Node, GPRS meaning General Packet Radio Service) module;
- an HSS/HLR (Home Subscriber Server/Home Location Register) module;
- a PDN-GW (Packet Data Network GateWay) module;
- a PCRF (Policy and Charging Rules Function) module;
- an MME (Mobility Management Entity) module;
- a Serving Gateway module;
- an MBMS-GW (Multimedia Broadcast Multicast Service GateWay) module.

As shown in FIG. 3, the base station eP25-FS 300 comprises a transposition layer which implements a standardized S1 interface of the standard specified for the 3GPP EPS and LTE family of technologies. It is thus observed that the eP25-FS 300 is directly linked to the MME module by a 3GPP S1-MME/M3 interface of the 3GPP EPS and LTE family of technologies. The eP25-FS 300 is directly linked to the Serving Gateway module by an S1-U interface of the 3GPP EPS and LTE family of technologies. The eP25-FS 300 is directly linked to the MBMS-GW module by an M1 interface. The base station eP25-FS 300 is directly linked to an eNobeB by an X2/M2 interface of the 3GPP EPS and LTE 3GPP X2/M2 family of technologies. Finally, the base station eP25-FS 300 is directly linked to another base station 304 according to the invention, called eP25-FS, by an X2/M2 interface of the 3GPP EPS and LTE 3GPP X2/M2 family of technologies.

The following table shows, for each interface, the type of interface, the characteristics of each end, the protocol characteristics and the SAE (System Architecture Evolution) services.

| Interface | | Characteristics of the ends | | Protocol Characteristics | | Services |
|---|---|---|---|---|---|---|
| name | Type | End 1 | End 2 | User Plane | Control Plane | SAE |
| E-UTRAN Uu | Air interface/Radio | Terminal UE | eNB | E-UTRA/LTE | | EPS/E-UTRAN EPS/eMBMS |
| APCO P25 | Air interface/Radio | Terminal P25 | eP25-FS eP25-RFSS | APCO P25 Common Air Interface (CAI) | | EPS/eP25 eMBMS/eP25 |
| S1 | Wire-IP | eP25-FS | MME | | S1-MME (S1AP/SCTP/IP) | EPS/eP25 |
| | | | Serving-GW | S1-U (GTP-U/UDP/IP) | | |
| | | eP25-RFSS | MME | | S1-MME (S1AP/SCTP/IP) | |
| | | | Serving-GW | S1-U (GTP-U/UDP/IP) | | |
| X2 | Wire-IP | eP25-FS | eP25-FS | X2-U (GTP-U/UDP/IP) | X2-C (X2AP/SCTP/IP) | EPS/eP25 |
| | | | eP25-RFSS | X2-U (GTP-U/UDP/IP) | X2-C (X2AP/SCTP/IP) | EPS/eP25 |
| | | | eNB | X2-U (GTP-U/UDP/IP) | X2-C (X2AP/SCTP/IP) | EPS/eP25 EPS/E-UTRAN |
| | | eP25-RFSS | eNB | X2-U (GTP-U/UDP/IP) | X2-C (X2AP/SCTP/IP) | EPS/eP25 EPS/E-UTRAN |
| M1 | Wire-IP | eP25-FS | eMBMS-GW | M1 (GTP-U/UDP/IP) | Non applicable | eMBMS/eP25 |
| | | eP25-RFSS | | M1 (GTP-U/UDP/IP) | Non applicable | eMBMS/eP25 |
| M2 | Wire-IP | eP25-FS/MCE eP25-RFSS/MCE (eP25-FS entity or eP25-RFSS housing logical MCE entity) | eP25-FS | Non applicable | M2 (M2AP/SCTP/IP) | eMBMS/eP25 |
| | | | eP25-RFSS | Non applicable | M2 (M2AP/SCTP/IP) | eMBMS/eP25 |
| | | | eNB | Non applicable | M2 (M2AP/SCTP/IP) | eMBMS/eP25 EPS/eMBMS |
| M3 | Wire-IP | eP25-FS/MCE eP25-RFSS/MCE (eP25-FS entity or eP25-RFSS housing logical MCE entity) | MME | Non applicable | M3 (M3AP/SCTP/IP) | eMBMS/eP25 EPS/eMBMS |

The P25 terminals covered by the base station eP25-FS 100 according to the invention are described in the HSS or HLR module of the 3rd or 4th or later generation of the 3GPP EPS and GPP LTE family of technologies.

Thus, each P25 terminal has a subscriber number identical to those used for the 3rd or 4th or later generation networks of the 3GPP EPS and 3GPP LTE family of technologies.

Thus, the base station eP25-FS 100 according to the invention allows a complete integration of the P25 networks and of the networks of the 3rd or 4th or later generation of the 3GPP EPS and 3GPP LTE family of technologies.

Mobility is ensured at two levels:
- by the 3rd or 4th or later generation network of the 3GPP EPS and LTE family of technologies which localizes (in its HSS/HLR database) the location of the P25 sub-network directly connected to the 3rd or 4th or later generation network of the 3GPP EPS and 3GPP LTE family of technologies, and
- by the P25 sub-network which localizes the radio site on which the mobile is registered.

In the case where the P25 sub-network is constituted by only a single radio site, this mechanism is simplified within the P25 sub-network.

The invention is not of course limited to the examples which have just been described and numerous modifications can be applied to these examples without departing from the scope of the invention.

The invention claimed is:

1. A method for connecting a base station belonging to a first mobile communications network of a narrow band type to a second mobile communications network of a wide band type, comprising:
    implementing a protocol layer of said base station to communicate with a first plurality of mobile terminals according to a first mobile communications standard;
    including a modification of said base station by integration of standardized transport layers and a functional transposition module embedded in a NAS (Non Access Stratum) layer in said protocol layer of said base station; and
    linking said base station to said second mobile communications network of the wide band type via a link of an Internet Protocol (IP) type,
    said base station being modified by integration of said transport layers and said transposition module embedded in said NAS layer in said protocol layer of said base station, and linked to said second mobile communications network of the wide-band type, said transport layers and said transposition module embedded in said NAS layer implementing an interface between the first and second mobile communications network.

2. The method according to claim 1, further comprising establishing exchanges between the first plurality of mobile terminals according to the first mobile communications standard placed under management of the modified base station and a second plurality of terminals according to said first mobile communications standard placed under management of another modified base station, via the second mobile communications network of the wide band type.

3. The method according to claim 1, further comprising establishing exchanges between the first plurality of mobile terminals according to the first mobile communications standard placed under management of the modified base station and a second plurality of mobile terminals according to a second mobile communications standard placed under control of base stations belonging to the second mobile communications network of the wide band type.

4. The method according to claim 1, wherein the first communications network of the narrow band type complies with Association of Public-safety Communications Officials (APCO) International Project 25 standard.

5. The method according to claim 4, wherein the second communications network of the wide band type complies with at least one of a 3GPP Evolved Packet Systems (EPS) standard and a LTE (Long Term Evolution) standard.

6. The method according to claim 5, wherein said transport layers and said transposition module embedded in said NAS layer implements a standardized 3GPP S1 interface for a Control Plane of the 3GPP LTE standard.

7. The method according to claim 6, wherein the standardized 3GPP S1 interface is completed by a standardized 3GPP X2 interface for a link between adjacent base stations.

8. The method according to claim 6, wherein the 3GPP S1 standardized interface is completed by a standardized 3GPP M1 interface.

9. A base station belonging to a first mobile communications network of a narrow band type, adapted for being connected to a second mobile communications network of a wide band type according to a second mobile communications standard, comprising: said base station implementing a protocol layer to communicate with a first plurality of mobile terminals according to a first mobile communications standard; and said base station is modified by integration of standardized transport layers and a functional transposition module embedded in a NAS (Non Access Stratum) layer in said protocol layer of said base station and is linked to said second mobile communications network of the wide band type via a link of an Internet Protocol (IP) type, another base station of said first mobile communications network being modified by integration of said standardized transport layers and said functional transposition module embedded in a NAS (Non Access Stratum) layer in said protocol layer, and linked to said second mobile communications network of the wide-band type, said standardized transport layers and said functional module embedded in a NAS (Non Access Stratum) layer implementing an interface between the first and second mobile communications network.

10. The base station according to claim 9, wherein the base station is configured for establishing exchanges between the first plurality of mobile terminals according to the first mobile communications standard placed under management of said base station and a second plurality of terminals placed under management of another modified base station, via the second mobile communications network of the wide band type.

11. The base station according to claim 9, wherein the base station is configured for establishing exchanges between the first plurality of mobile terminals according to the first mobile communications standard placed under control of said base station and a second plurality of mobile terminals according to a second mobile communications standard placed under control of base stations belonging to the second mobile communications network of the wide band type.

12. The base station according to claim 9, wherein the second communications network of the wide band type complies with a 3GPP LTE (Long Term Evolution) standard.

13. The base station according to claim 12, wherein said standardized transport layers and said functional module embedded in a NAS (Non Access Stratum) layer implements a standardized S1 interface of a 3GPP LTE standard.

14. The base station according to claim 13, wherein the standardized 3GPP S1 is completed by a standardized 3GPP X2 interface.

15. The base station according to claim 14, wherein the standardized 3GPP S1 interface is completed by a standardized 3GPP M1 interface.

16. A fixed radio sub-system belonging to a first mobile communications network of a narrow band type, adapted for being connected to a second mobile communications network of a wide band type according to a second mobile communications standard, comprising: said fixed radio sub-system implementing, by a processor, a protocol layer to communicate with a first plurality of base stations, by a transceiver, according to a first mobile communications standard; and said fixed radio sub-system is modified by integration of standardized transport layers and a functional transposition module embedded in a NAS (Non Access Stratum) layer in said protocol layer of said fixed radio-sub system, and is linked to said second mobile communications network of the wide band type via a link of an Internet Protocol (IP) type, said fixed radio sub-system being modified by integration of said standardized transport layers and a functional transposition module embedded in a NAS (Non Access Stratum) layer in said protocol layer, and linked to said second mobile communications network of the wideband type, said standardized transport layers and a functional transposition module embedded in a NAS (Non Access Stratum) layer implementing an interface between the first and second mobile communications network.

* * * * *